United States Patent
Cendrowicz (10) Patent No.: US 10,486,225 B2
(45) Date of Patent: Nov. 26, 2019

(54) METHOD AND APPARATUS FOR PARTICLE INJECTION MOULDING

(71) Applicant: ROLLS-ROYCE plc, London (GB)

(72) Inventor: Aleksander M Cendrowicz, Derby (GB)

(73) Assignee: ROLLS-ROYCE plc, London (GB)

( * ) Notice: Subject to any disclaimer, the term of this patent is extended or adjusted under 35 U.S.C. 154(b) by 282 days.

(21) Appl. No.: 15/641,034

(22) Filed: Jul. 3, 2017

(65) Prior Publication Data

US 2018/0015532 A1 Jan. 18, 2018

(30) Foreign Application Priority Data

Jul. 15, 2016 (GB) .................................. 1612294.7

(51) Int. Cl.
| | | |
|---|---|---|
| *B29C 33/02* | (2006.01) | |
| *B22C 9/10* | (2006.01) | |
| *B29C 33/00* | (2006.01) | |
| *B29C 33/04* | (2006.01) | |
| *B28B 1/24* | (2006.01) | |
| *B28B 7/42* | (2006.01) | |

(52) U.S. Cl.
CPC .................. *B22C 9/10* (2013.01); *B28B 1/24* (2013.01); *B28B 7/42* (2013.01); *B29C 33/0083* (2013.01); *B29C 33/02* (2013.01); *B29C 33/04* (2013.01); *B29C 2033/042* (2013.01)

(58) Field of Classification Search
CPC .............. B29C 33/04; B29C 2033/042; B29C 33/0083
See application file for complete search history.

(56) References Cited

U.S. PATENT DOCUMENTS

| | | | | |
|---|---|---|---|---|
| 3,721,103 A | * | 3/1973 | Brandt ....................... | F25C 1/04 |
| | | | | 264/302 |
| 3,738,777 A | * | 6/1973 | von Starck .......... | B22D 39/006 |
| | | | | 417/50 |
| 4,384,607 A | | 5/1983 | Wood et al. | |
| 5,035,602 A | * | 7/1991 | Johnson .................. | B29C 33/76 |
| | | | | 249/175 |
| 5,045,251 A | * | 9/1991 | Johnson .................. | B29C 33/76 |
| | | | | 264/102 |

(Continued)

FOREIGN PATENT DOCUMENTS

| | | |
|---|---|---|
| CS | 272 901 B1 | 2/1991 |
| JP | 2002-120045 A | 4/2002 |

(Continued)

OTHER PUBLICATIONS

Nov. 29, 2017 Search Report issued in European Patent Application No. 17 17 9361.

(Continued)

*Primary Examiner* — Timothy Kennedy
(74) *Attorney, Agent, or Firm* — Oliff PLC (57) ABSTRACT

A die for moulding a core by a PIM process, the core having at least one internal feature, the die including; a first die part defining a first portion of an outer surface of the core; a second die part defining a second portion of the outer surface of the core; and an internal feature forming element for defining the surface of an internal feature of the core; wherein the internal feature forming element incorporates a temperature control circuit.

17 Claims, 5 Drawing Sheets

(56) References Cited

U.S. PATENT DOCUMENTS

| | | | | |
|---|---|---|---|---|
| 5,058,655 | A | * | 10/1991 | Derp .................. B22C 9/24 164/126 |
| 5,264,163 | A | | 11/1993 | Lemelson |
| 5,317,805 | A | * | 6/1994 | Hoopman .............. B23P 15/26 257/E23.098 |
| 6,505,673 | B1 | | 1/2003 | Abuaf et al. |
| 2004/0222566 | A1 | * | 11/2004 | Park .................. B29C 33/06 264/338 |
| 2011/0049754 | A1 | * | 3/2011 | Mahaffy ............ B29C 33/3857 264/219 |
| 2011/0120131 | A1 | * | 5/2011 | Ostlund ................ F03G 7/06 60/670 |
| 2013/0220572 | A1 | * | 8/2013 | Rocco ................ B22C 9/02 164/520 |
| 2014/0216404 | A1 | * | 8/2014 | Armesto ............ F02M 37/0052 123/445 |
| 2014/0237784 | A1 | * | 8/2014 | Lacy .................. B23P 15/00 29/17.3 |
| 2015/0218962 | A1 | * | 8/2015 | Weber ................ B22C 9/24 415/175 |

FOREIGN PATENT DOCUMENTS

| | | |
|---|---|---|
| JP | 2008-188635 A | 8/2008 |
| JP | 2010-082684 A | 4/2010 |
| JP | 5021840 B1 | 9/2012 |
| JP | 2013-086170 A | 5/2013 |
| WO | 2010/101123 A1 | 9/2010 |

OTHER PUBLICATIONS

Mar. 14, 2017 Search Report issued in British Patent Application No. 1612294.7.

* cited by examiner

METHOD AND APPARATUS FOR PARTICLE INJECTION MOULDING

FIELD OF THE INVENTION

The invention is concerned with particle injection moulding (PIM), for example (but without limitation), in the manufacture of ceramic cores for use in the investment casting of gas turbine blades. More particularly the invention is concerned with improved die apparatus which facilitates temperature control of internal features of a core moulded using the apparatus in a PIM process.

BACKGROUND TO THE INVENTION

Investment casting is an evolution of the lost-wax process whereby a component of the size and shape required in metal is manufactured using wax injection moulding. The moulded wax pattern is then dipped in ceramic slurry to create a shell; the wax is then removed and the ceramic shell fired to harden it. The resultant shell has open cavities into which molten metal can be poured to produce a metal component of the required shape and size. For example (but without limitation) the process is known to be used in the manufacture of turbine blades for gas turbine engines.

In gas turbine engines, the blades operate in an extremely high temperature environment. It is known to provide cooling channels within the blades through which cooling air can be circulated. These channels are known to be made by placing ceramic cores within a ceramic shell prior to casting the metal blade. The core has a geometry which defines the shape of the cooling channels within the resulting hollow blade. After the metal blade has been cast, the core may be leached from the cast blade, for example by use of an alkaline solution, leaving the hollow metal component.

Ceramic cores are known to be manufactured by particle injection moulding (PIM). In such a process, a ceramic material such as silica is suspended in an organic binder (also known as the "vehicle") to create a feedstock. The feedstock is injected into a die cavity of the required size and shape to create a "green" component which comprises the ceramic and a binder. The binder is then thermally or chemically removed from the green component and the ceramic consolidated by sintering at elevated temperatures to provide the final ceramic core.

FIGS. 1 to 4 illustrate a typical die used for the PIM of a ceramic core for use in the investment casting of a turbine blade for a gas turbine engine.

Figure 1:
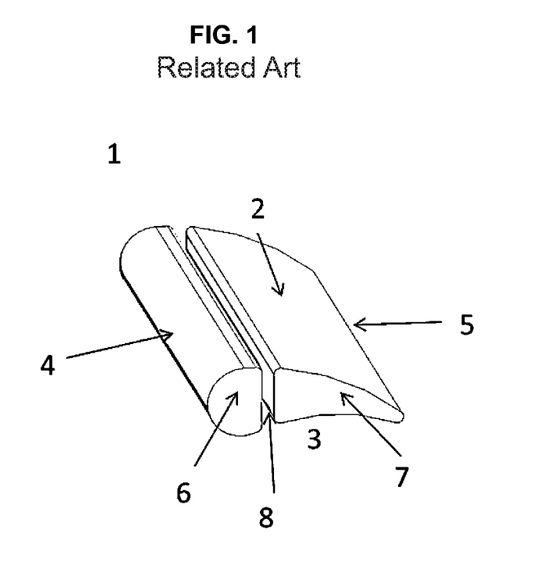
FIG. 1 shows a ceramic core for a turbine blade of a design known from the prior art.

FIG. 1 shows a ceramic core 1 for the formation of channels in the shape of an aerofoil. The core has a suction side surface 2, a pressure side surface 3, a leading edge surface 4, a trailing edge radius 5, a leading edge passage section 6, a trailing edge passage section 7, and an internal feature 8 separating the leading edge passage section 6 from the trailing edge passage section 7. The internal feature 8 typically maintains a gap separating the leading edge passage section 6 and trailing edge passage section 7 and may be in the form of a bump or rib extending from one of these sections and which maintains separation of these sections once the metal component has been cast and the ceramic core has been removed.

Figure 2:
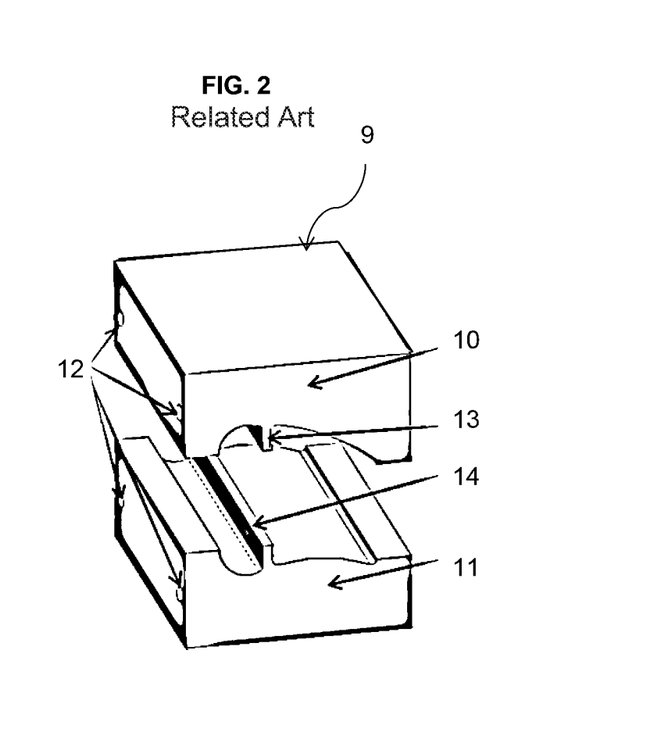
FIG. 2 shows a die for moulding the ceramic core of FIG. 1 in a PIM process as is known from the prior art.

FIG. 2 shows a ceramic core die 9 that is used to form the core shown in FIG. 1. The core die 9 has a suction side forming half 10, and a pressure side forming half 11. It is known to have water cooling channels 12 that maintain the die at a constant and uniform temperature. Also illustrated are the elements 13 and 14 which form an internal feature within the core.

Figure 3:
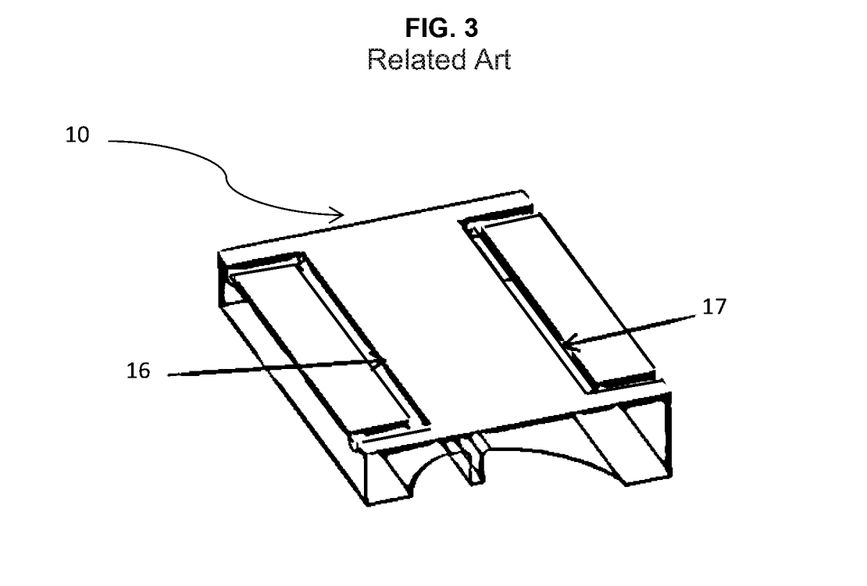
FIG. 3 shows a cutaway view of the die of FIG. 2.

FIG. 3 shows a cut away view of the suction side forming core die half 10, showing a first cooling circuit 16 which provides temperature control to the leading edge forming part of the die and a second cooling circuit 17 which provides temperature control to the trailing edge forming part of the die. It is known to maintain the narrower trailing edge temperature slightly warmer than the wider leading edge temperature in order to help with the fill of the narrower regions of the component. It is also known to increase the temperature of injection, thereby allowing the ceramic paste to remain fluid for a greater period of time as it flows into the die. During cooling, the central portion of the ceramic core stays hot for a longer period of time. This can lead to surfaces of the internal feature 8 becoming significantly warmer than is desirable. Subsequently, this may lead to defects in that region which occur as the result of the ceramic core material adhering to the die as a consequence of the elevated local temperature.

Figure 4:
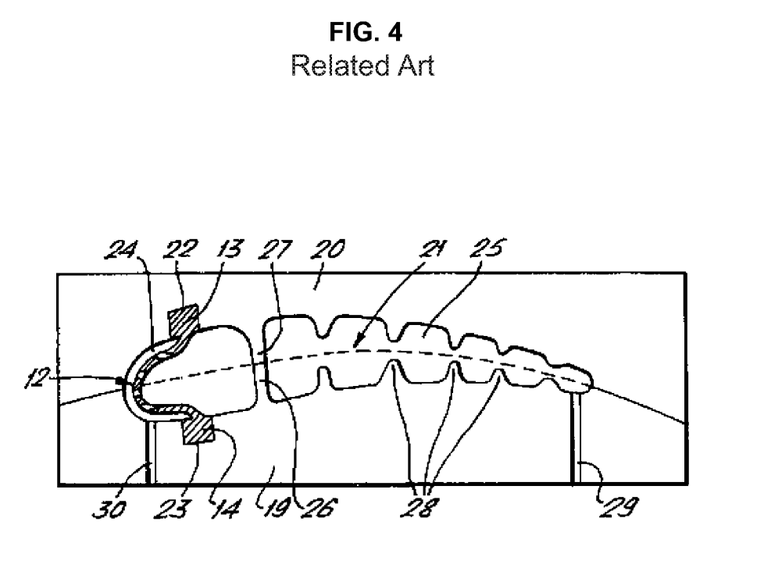
FIG. 4 is a reproduction of FIG. 2 from the applicant's prior published patent application U.S. Pat. No. 4,384,607 which illustrates the use of a sacrificial insert to form an internal feature of a core in a die similar to that of FIG. 2.

The internal feature forming element 13, 14 may alternatively comprise a sacrificial insert manufactured separately from other parts of the core and die. An example is described in the Applicant's prior published U.S. Pat. No. 4,384,607. FIG. 4 is a reproduction of FIG. 2 of U.S. Pat. No. 4,384,607 and shows a sacrificial insert 22 used to form an internal feature within a core. In manufacture of the core, the insert 22 is located within a first pocket in one die half and a second pocket in the second die half. Ceramic core material is injected into the core die. The external core surface is formed by the die and the internal feature surface of the core is formed by the sacrificial insert. Following a prescribed cooling time, the ceramic core and insert assembly are removed from the core die. The insert may then be removed from the core, for example by dissolving in a solvent. The ceramic core is then fired in the standard manner. A problem identified with use of the sacrificial insert results from it typically being made from a material that has a lower coefficient of thermal conductivity than the core die. Consequently, the surface defects resulting on the surface of the internal feature 22 from local hot spots present due to ceramic core material cooling are generally more acute.

It is an object of the invention to provide an apparatus and method for providing a component by PIM wherein intricate features such as the internal feature described above can be formed with reduced surface defects.

STATEMENT OF THE INVENTION

In accordance with the invention there is provided a die for moulding a core by a PIM process, the core having at least one internal feature, the die comprising;

a first die part defining a first portion of an outer surface of the core;

a second die part defining a second portion of the outer surface of the core; and an internal feature forming element for defining the surface of an internal feature of the core; wherein the internal feature forming element incorporates a temperature control circuit.

In another aspect, the invention provides a PIM process for moulding a core the core having at least one internal feature, the PIM process comprising;

providing a die, the die comprising; a first die part defining a first portion of an outer surface of the core; a second die part defining a second portion of the outer surface of the core; and an internal feature forming element for defining the surface of an internal feature of the core; wherein the internal feature forming element incorporates a temperature control circuit;

introducing a feedstock into the die, introducing temperature control via a medium contained in the temperature control circuit whereby to control the thermal environment adjacent the internal feature during solidification of the core.

In some embodiments the temperature control circuit comprises one or more micro-channels passing through a substantial part of the element. Optionally, the micro-channels connect with a supply of coolant fluid which is caused to flow through the micro-channels during the PIM process.

In simple examples, the coolant is a fluid circulated through the micro-channels to draw heat from the surrounding surfaces. For example, the cooling fluid is water.

Alternatively, in some embodiments the coolant may be a substance that undergoes a phase change and makes use of the latent heat energy associated with the phase change to cool the surrounding surfaces. For example, the phase change occurs at a specific temperature or over a known temperature range. In an example, solid gallium may be employed as a coolant in micro-channels that are sealed. In this example, on reaching a temperature over 30 degrees, the gallium will melt, and in doing so it will absorb latent energy from the surrounding surfaces of the internal feature forming element. In another example, a hydrocarbon may be contained within a circuit that is linked to an appropriate expansion chamber. On heating, the hydrocarbon will vaporise and provide a cooling effect to the internal feature forming element.

In another alternative, the coolant may comprise a substance held under pressure within the cooling circuit and provides a cooling effect through a sudden drop in pressure induced by an external mechanism in communication with the circuit.

The circuit may comprise an elongate and convoluted channel which snakes through the element from a first end to a second end. Alternatively, the circuit may comprise an array of micro-channels which are connected at one or both ends by cross-channels. The circuit may be in the form of a web or lattice of micro-channels.

In an alternative, the circuit may comprise an embedded heat conductor, for example a wire. For example, the wire is elongate and convoluted and snakes through the element from a first end to a second end. Such a heating element may be used to provide local heating to induce a reaction within a binder system of a feedstock from which the core is to be moulded, for example, the binder system may comprise a thermosetting polymer and heat from the heat conductor may be used to induce thermosetting of the polymer.

For example, where the core is a ceramic core for a turbine blade, the internal feature formed by the internal feature forming element may be a slot that forms a web in the turbine component, or a hole that forms a pedestal or pin-fin within the turbine component.

In some embodiments, some or all of an insert may remain in the ceramic core. For example, the insert may comprise a quartz rod or an alumina pin which remains in situ in the core.

The direct temperature control of an internal feature forming element using a temperature control circuit in the element, allows a temperature controlling medium to be provided into an area of the ceramic core that would otherwise form a hot or cold spot relative to the overall die temperature during an injection moulding process. The arrangement allows for more complex ceramic cores to be manufactured with a reduction in surface defects on internal features of the cores. This permits an advantageous increase in the ceramic core complexity which can be used to provide gas turbine component designs with reduced cooling air requirements. A consequent increase in gas turbine efficiency and a related reduction in specific fuel consumption costs is expected to result when the die design is used for manufacture of ceramic cores for use in the investment casting of gas turbine components.

Figure 7:
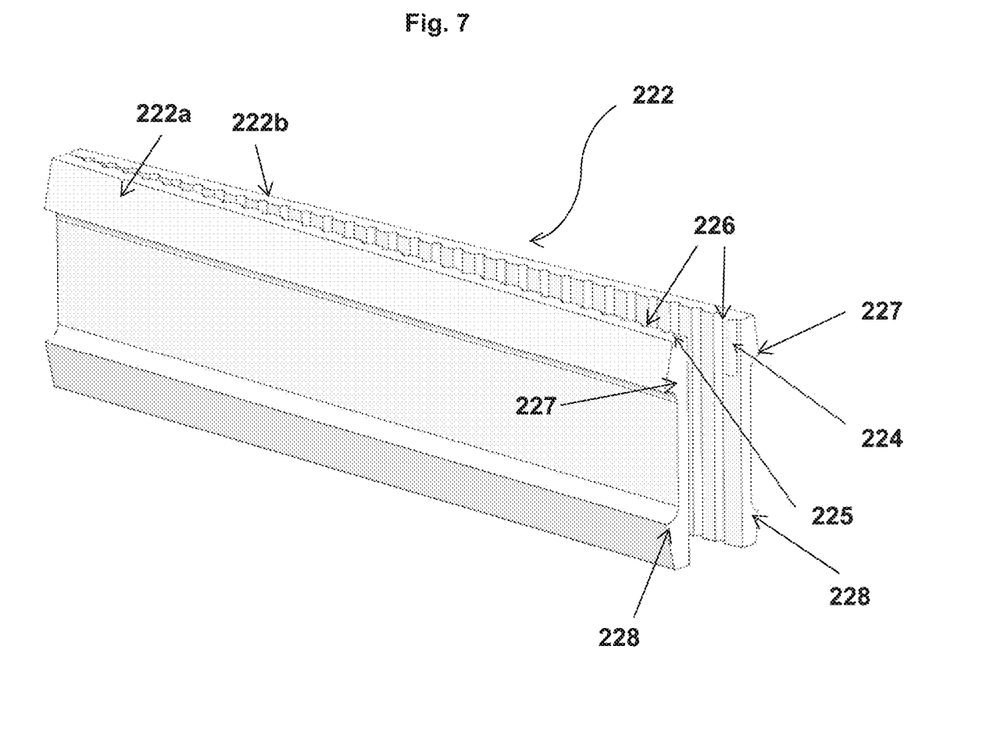
FIG. 7 shows in further detail a sacrificial insert similar to that of the embodiment of FIG. 6.

The internal feature forming element (which, as previously discussed may be integral to the core die, or a separate insert) may be formed using a number of different known manufacturing methods. For example, but without limitation, such methods include; forming methods such as injection moulding; machining methods such as milling, grinding, drilling or electro-discharge machining; additive manufacturing methods such as fused deposition modelling, selective laser sintering; or assembly methods, where multiple sub components are joined together. One assembly method which may be utilised is shown in FIG. 7 and discussed in more detail below, where two halves of the insert are manufactured by using a moulding process and are joined together using known joinery methods such as tongue (24) and groove (25). Another method is to form the insert in one piece and drill the holes using conventional or laser drilling. The micro-channels within the metal die are best placed to be formed by using laser drilling or electro discharge machining.

The micro-channels themselves are configured and arranged to improve the heat transfer behaviour with the aim of reducing the ceramic core surface defects. The micro-channels may be straight, spiral, contoured or follow a serpentine arrangement. The micro-channels may contain turbulators, pin fins or pedestal features that increase the cooling effectiveness. They may be coated in a substance that improves the heat transfer coefficient. They may follow a contour which creates a thinner wall closer to the ceramic core defect area, in order to increase the local rate of heat transfer but have a thicker wall elsewhere in order to provide structural rigidity to the internal feature forming element.

The micro-channel containing inserts used for forming internal features, may also be constructed such that they form external features, either as part of or in isolation to the internal features of the core. This concept may be extended such that the core is manufactured entirely by a plurality of micro-channel containing sacrificial formers.

The micro-channels may be designed such that the temperature and heat transfer is variable as a function of position of the surface on the internal feature forming element. One way of achieving this is by having a number of inlets, some that are in fluid communication with micro-channels which require high heat transfer rates, and others that require lower heat transfer rates. In an alternative, a locally higher heat transfer rate may be achieved by increasing the local surface area through the introduction of turbulators or pin fins in the circuit. In another alternative, the flow network is arranged to channel a heat transfer medium to an area with the highest requirement in the first instance, and then the partially spent medium is recirculated to control the temperature elsewhere where the need for heat transfer is less.

Whilst the examples given are mostly directed to the manufacture of ceramic cores for turbine blades, it is to be understood that the invention has wider application. The principles of the invention can be applied in the manufacture of any component by PIM where that component comprises a main body with a relatively intricate internal feature.

BRIEF DESCRIPTION OF THE DRAWINGS

Embodiments of the invention will now be described with reference to the accompanying Figures in which.

DETAILED DESCRIPTION OF SOME EMBODIMENTS

Figure 5:
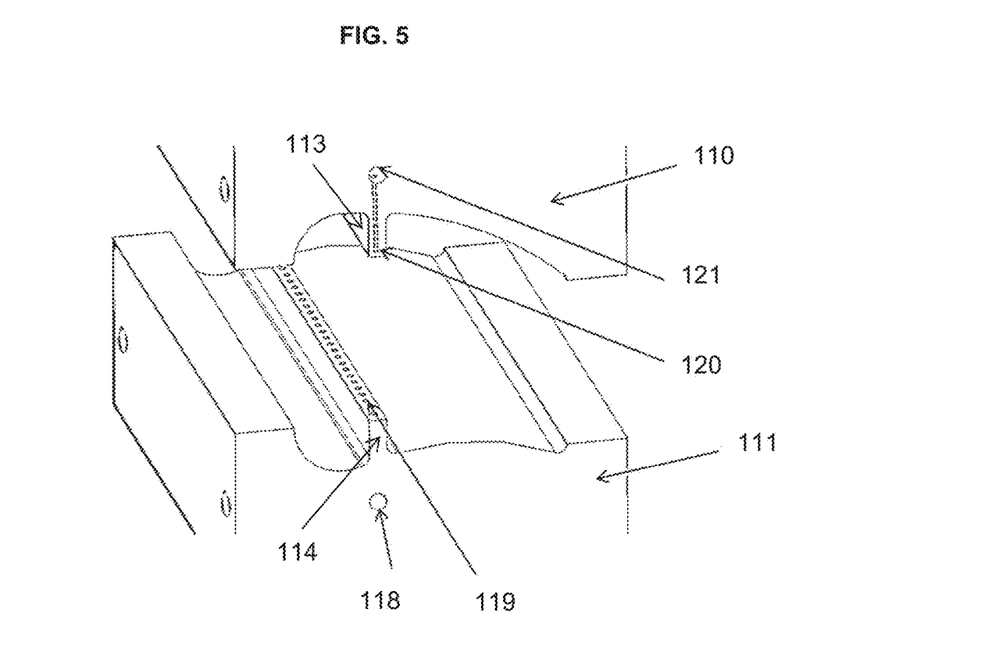
FIG. 5 shows a first embodiment of a die in accordance with the present invention.

As can be seen from FIG. 5, elements forming the surfaces of an internal feature of the ceramic core are provided with a plurality of micro-channels that permit cooling by passing a cooling medium through the micro-channels. This serves to reduce the temperature of the surfaces of an internal feature during cooling of a ceramic core in the die. As can be seen, a pressure side ceramic core forming a pressure side die half 111, has a cooling fluid inlet 118, which supplies cooling fluid to a plurality of cooling micro-channels 119, contained within the internal feature forming element 114. The cooling fluid proceeds to flow through additional micro-channels 120, that are contained within a suction side core die half 110 within the internal ceramic core feature forming element 113. The cooling fluid proceeds to flow to an exit 121 within the suction side forming die half 110.

Figures 6A, 6B, 6C:
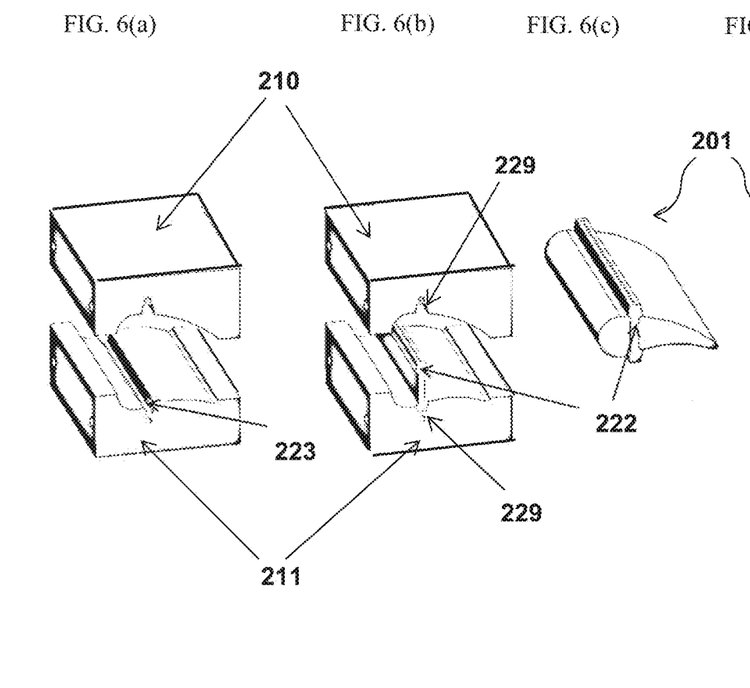
FIG. 6(a) shows a first view of a second embodiment of a die in accordance with the present invention.
FIG. 6(b) shows a second view of a second embodiment of a die in accordance with the present invention.
FIG. 6(c) shows a first view of a core produced using the die of FIGS. 6(a) and 6(b)

FIGS. 6 (a) and (b) shows an alternative embodiment of the invention wherein rather than from two parts, the die is formed from an assembly of three parts. These parts comprise a suction side core die half 210, a pressure side core die half 211 and an internal feature forming die part 222. The internal feature forming die part 222 may comprise a different material from the other die parts 210 and 211. In the Figure, the internal feature forming die part 222 comprises a sacrificial insert. The sacrificial insert contains a plurality of micro-channels, and is located in a pocket 223 that also contains a series of micro-channels, designed to line up with the micro-channels of the insert 222. By means of the aligned channels, a cooling fluid may flow between the suction side core die half 210 and the pressure side core die half 211 through the insert 222, thereby allowing temperature at the surface of the insert 222 to be controlled. This has the effect of eliminating the previously mentioned temperature created defects associated with the prior art of U.S. Pat. No. 4,384,607.

Figure 6D:
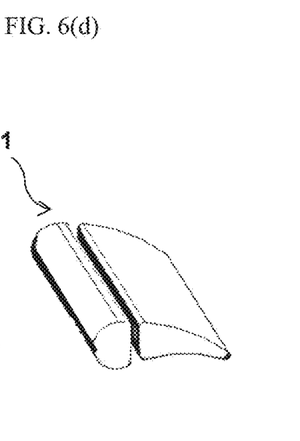
FIG. 6(d) shows a second view of a core produced using the die of FIGS. 6(a) and 6(b)

In FIG. 6(a) the suction side core die part 210 and pressure side core die part 211 are arranged in alignment. In FIG. 6(b) ends of the sacrificial internal feature forming die part 222 is received in a recess of the suction side core die part 210. Subsequently the pressure side core die part 211 can be added with an opposite end of the sacrificial internal feature forming the die part 222 being received in a recess 229 of the pressure side core die part 211. The core 201 is then moulded in the assembled die. FIG. 6 (c) shows core 201 after the suction side core die part 210 and pressure side core die part 211 have been removed. In FIG. 6(d), the sacrificial internal feature forming the die part 222 has been removed.

Figure 8A:
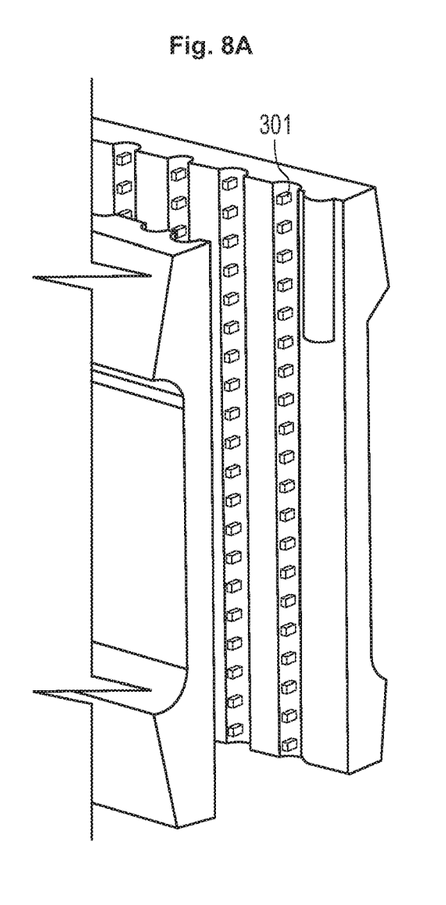
FIG. 8(a) shows in further detail a sacrificial insert including turbulators.
Figure 8B:
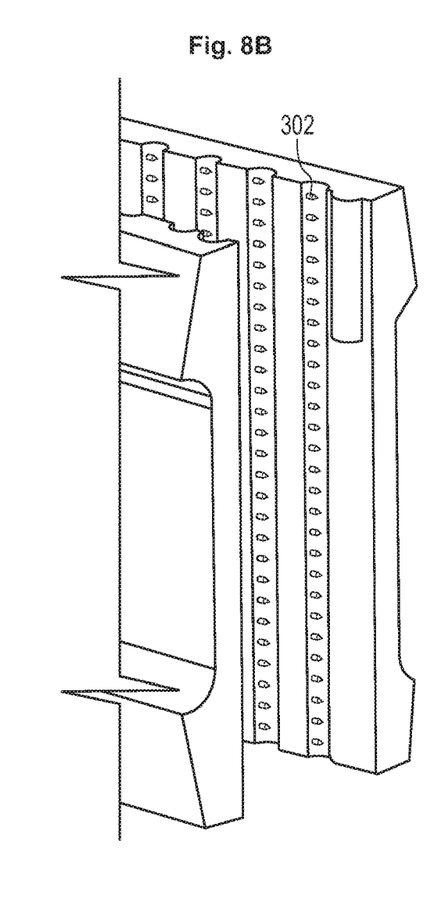
FIG. 8(b) shows in further detail a sacrificial insert including pin fins.
Figure 8C:
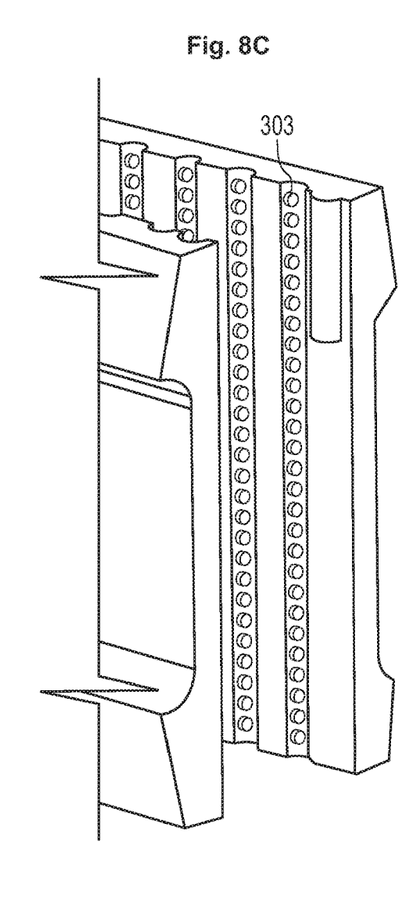
FIG. 8(c) shows in further detail a sacrificial insert including pedestal features.

FIG. 7 shows a more detailed view of a sacrificial insert 222 for use in the die of FIG. 6. In this embodiment, the insert is made from two plates 222a and 222b. Each plate is provided on one surface with an array of micro-channels 226. When the plates 222a, 222b are aligned, the micro-channels 226 on opposing faces together define an array of micro-tubes passing through the assembled insert 222. The plates 222a, 222b may be fastened together by means of tongue 224 and groove 225 components on oppositely facing surfaces of the plates 222a and 222b. On a second surface (that is no the surface in which the channels 226 are provided) each plate 222a, 222b is provided with lips 227 and 228 which, in pairs, form ribs which are proportioned to be securely received in recesses 229 of the suction side core die part 210 and pressure side core die part 211. Further, as shown in FIGS. 8(a)-(c), the micro-channels 226 contain one or more of: turbulators 301, pin fins 302, or pedestal features 303.

The two halves of the insert are manufactured by, for example, a moulding process. In an alternative method, the insert may be formed as a single plate and holes drilled to form the micro-channels using conventional or laser drilling. The micro-channels within the metal die are best placed to be formed by using laser drilling or electro discharge machining.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A die for moulding a core by a particle injection moulding (PIM) process, the core having at least one internal feature, the die comprising:
    a first die part defining a first portion of a cavity of the die, which is configured to form an outer surface of the core;
    a second die part defining a second portion of the cavity of the die, which is also configured to form the outer surface of the core; and
    an internal feature forming sacrificial insert configured to define an outer surface of the at least one internal feature of the core, the sacrificial insert being inserted into a respective recess of each of the first die part and the second die part and extending between the first die part and the second die part, the sacrificial insert including a temperature control circuit formed by at least a plurality of micro-channels extending through an interior of the sacrificial insert between the first die part and the second die part.

2. The die as claimed in claim 1, wherein the plurality of micro-channels connect with a supply of coolant fluid that flows through the plurality of micro-channels during the PIM process.

3. The die as claimed in claim 1, wherein the plurality of micro-channels contain a substance that, upon undergoing a phase change, uses a latent heat energy associated with the phase change to cool surrounding surfaces.

4. The die as claimed in claim 3, wherein the substance is solid gallium.

5. The die as claimed in claim 3, wherein the temperature control circuit is connected to an expansion chamber, and the plurality of micro-channels contain a hydrocarbon.

6. The die as claimed in claim 2, wherein the coolant fluid is water.

7. The die as claimed in claim 1, wherein the temperature control circuit includes an embedded heat conductor.

8. The die as claimed in claim 7, wherein the embedded heat conductor is a wire that is elongate and convoluted, and snakes through the sacrificial insert from a first end to a second end.

9. The die as claimed in claim 1, wherein the temperature control circuit is configured such that temperature and heat transfer is variable as a function of position on the sacrificial insert.

10. The die as claimed in claim 1, wherein the plurality of micro-channels are any one or more of: straight, spiral, contoured, or serpentine.

11. The die as claimed in claim 1, wherein the plurality of micro-channels contain one or more of: turbulators, pin fins or pedestal features configured to increase cooling effectiveness in the plurality of micro-channels.

12. The die as claimed in claim 10, wherein the plurality of micro-channels contain one or more of: turbulators, pin fins, or pedestal features configured to increase cooling effectiveness in the plurality of micro-channels.

13. The die as claimed in claim 1, wherein the plurality of micro-channels are coated in a substance that improves a heat transfer coefficient.

14. The die as claimed in claim 10, wherein the plurality of micro-channels are coated in a substance that improves a heat transfer coefficient.

15. The die as claimed in claim 11, wherein the plurality of micro-channels are coated in a substance that improves a heat transfer coefficient.

16. The die as claimed in claim 1, wherein the sacrificial insert is formed integrally with one or both of the first die part and the second die part.

17. The die as claimed in claim 1, wherein the sacrificial insert includes an element that is separate from and receivable into one or both of the first die part and the second die part to assemble the die.

* * * * *